(12) United States Patent
  Dickie

(10) Patent No.: US 9,847,806 B1
(45) Date of Patent: Dec. 19, 2017

(54) CELL PHONE CASE

(71) Applicant: Robert G. Dickie, King City, CA (US)

(72) Inventor: Robert G. Dickie, King City, CA (US)

(*) Notice: Subject to any disclaimer, the term of this patent is extended or adjusted under 35 U.S.C. 154(b) by 0 days.

(21) Appl. No.: 15/217,059

(22) Filed: Jul. 22, 2016

(51) Int. Cl.
  *H04M 1/00* (2006.01)
  *H04B 1/3888* (2015.01)
  *G06F 1/16* (2006.01)
  *H04M 1/02* (2006.01)

(52) U.S. Cl.
  CPC ........... *H04B 1/3888* (2013.01); *G06F 1/166* (2013.01); *H04M 1/0202* (2013.01)

(58) Field of Classification Search
  CPC .................... H04B 1/3888; H04M 1/0283
  See application file for complete search history.

(56) References Cited

U.S. PATENT DOCUMENTS

| | | | |
|---|---|---|---|
| D560,068 S | 1/2008 | Dixon | |
| D640,679 S | 6/2011 | Willes et al. | |
| D646,671 S | 10/2011 | Fathollahi | |
| D646,673 S | 10/2011 | Fathollahi | |
| D647,895 S | 11/2011 | Fathollahi | |
| D674,803 S | 1/2013 | Westrup | |
| D695,297 S | 12/2013 | Sun et al. | |
| 8,718,731 B1* | 5/2014 | Tang | H04M 1/185 206/305 |
| D717,804 S | 11/2014 | Budge | |
| D745,524 S | 12/2015 | Hung | |
| 9,314,078 B1* | 4/2016 | Haymond | A45C 11/00 |
| D764,478 S | 8/2016 | Radmard | |
| D795,263 S | 8/2017 | Fujioka et al. | |
| 2014/0252786 A1* | 9/2014 | Singhal | G06F 1/1626 294/137 |
| 2016/0080022 A1* | 3/2016 | Radmard | H04M 1/185 455/575.8 |

* cited by examiner

Primary Examiner — Ankur Jain
Assistant Examiner — Max Matthew
(74) Attorney, Agent, or Firm — Sand & Sebolt

(57) ABSTRACT

A cellular phone protection case that has four impact absorbing corners and a planar body extending therebetween. Portions of the planar body are asymmetrical relative to imaginary central axes associated with the planar body. Additionally, the four corners define free spaces therebetween to define a cell phone cover that is substantially free of planar sidewalls extending between respective corners. The corners may deflect to repeatably engage a cell phone at complementarily shaped cellphone corners.

3 Claims, 10 Drawing Sheets

CELL PHONE CASE

BACKGROUND

Technical Field

Generally, the current disclosure relates to a cellular phone case. Specifically, the current disclosure is directed to a minimalistic cellular phone protection case that has four impact absorbing foam corners and a stamped stainless body to provide sufficient protection for most of cellular phones.

Background Information

Ever since smart phones came into the cellular phone market, people are more concerned about protecting their cellular phones since the smart phone has a LCD panel on its front end which can be easily broken if a user drops it on the ground. It has a full aluminum frame to cover its entire body, once it is dropped on the ground, the body is easily scratched. At the same time, the cost of repair the LCD panel and aluminum body is expensive. Thus, there are needs for a market to protect smart phones, and the market rapidly grows.

However, recently, some smart phone protection cases become so bulky and heavy that it is not easy for a user to carry out the phone in one hand or to put a smart phone with the case in his/her pocket. Furthermore, since bulky smart phone cases cover the entire surface of a smart phone, it is not very operative. Touching or operating switches on the side of the smart phone is not easy due to a bulky protection case. Still further, since bulky and heavy protection cases cover the entire surface of a smart phone, it is not fashionable. Even though some smart phones have shiny and beautiful metal surface, due to a bulky protection case, a user cannot appreciate the beauty of his/her smart phone.

SUMMARY

A need for protecting a smart phone continues to exist and it is desired in the art to provide a minimalistic smart phone protection case to prevent a smart phone from being damaged.

In one embodiment of the present disclosure, a cell phone case may include a body including four corners and defining a longitudinal center axis and a transverse center axis and four distinct corner covers, wherein each one of the four covers does not contact the other three corner covers.

In accordance with yet another aspect, an embodiment of the present disclosure may provide a cell phone case comprising: a planar body defining a central longitudinal first axis and a central transverse second axis adapted to lie flat against a back surface of a cell phone; a first corner spaced from a second corner defining a transversely aligned first free space therebetween; a third corner spaced from a fourth corner defining a transversely aligned second free space therebetween; wherein a longitudinally aligned third free space is defined between the first corner and the third corner and a longitudinally aligned fourth free space is defined between the second corner and the third corner; and wherein the planar body is connected to the first corner, the second corner, the third corner, and the fourth corner. This embodiment may also include a first arcuate edge extending from the first corner to the third corner; a second arcuate edge extending from the second corner to the fourth corner; and wherein the first and second edges are symmetric relative to the longitudinal center axis. This embodiment may also include wherein the first arcuate edge and the second arcuate edge have a similar radius of curvature. This embodiment may also include wherein the first arcuate edge is asymmetrical relative to the transverse center axis. This embodiment may also include wherein the second arcuate edge is asymmetrical relative to the transverse center axis. This embodiment may also include wherein the body further comprises: a third arcuate edge extending from the first corner to the second corner; a fourth arcuate edge extending from the third corner to the fourth corner; wherein the third and fourth edges are symmetric relative to the transverse center axis. This embodiment may also include wherein the third arcuate edge and the fourth arcuate edge are symmetrically located around the transverse center axis. This embodiment may also include wherein the third arcuate edge and the fourth arcuate edge have a similar radius of curvature. This embodiment may also include a first cover surrounding the first corner; a second cover surrounding the second corner; a third cover surrounding the third corner; and a fourth cover surrounding the fourth corner. This embodiment may also include wherein each corner forms a plurality of through holes. This embodiment may also include wherein the four covers are over-molded around the four corners of the body and extend through the plurality of holes respectively. This embodiment may also include wherein each cover comprises a first portion adapted to engage the cell phone and an opposite second portion connected together and extending around a first end the respective corner; and the first and second portion not connected at a second end of the corner. This embodiment may also include wherein the first portion and the second portion are interconnected through the plurality of holes. This embodiment may also include wherein the four covers engage a cell phone and protrude forwardly and rearwardly beyond top and bottom surfaces of the cell phone so that the cell phone cannot contact an impacting surface when dropped. This embodiment may also include wherein each cover further comprises a lip which can deflect so that the lip can repeatably and releasably engage the top surface of the cell phone. This embodiment may also include four S-shaped connectors that respective connect each corner to the planar body, wherein each S-shaped connector includes a first end coplanar with the body and a second end offset from the first end such that the second end projects outwardly beyond the planar body.

In accordance with yet another aspect of the present disclosure, an embodiment may provide a cell phone case comprising: a central longitudinal first axis and a central transverse second axis; a first corner spaced from a second corner defining a transversely aligned first free space therebetween; a third corner spaced from a fourth corner defining a transversely aligned second free space therebetween; wherein a longitudinally aligned third free space is defined between the first corner and the third corner and a longitudinally aligned fourth free space is defined between the second corner and the third corner; and a distinct first cover entirely surrounding a first side of the first corner adapted to engage a cell phone and at least partially surrounding an opposite second side of the first corner; a distinct second cover entirely surrounding a first side of the second corner adapted to engage the cell phone and at least partially surrounding an opposite second side of the second corner; a distinct third cover entirely surrounding a first side of the third corner adapted to engage the cell phone and at least partially surrounding an opposite second side of the third corner; and a distinct fourth cover entirely surrounding a first side of the fourth corner adapted to engage the cell phone and at least partially surrounding an opposite second side of the fourth corner. This embodiment may also include a first hole formed in the first corner, wherein a portion of the first cover extends through the first hole; a second hole formed in the second corner, wherein a portion of the second cover extends through the second hole; a third hole formed in the third corner, wherein a portion of the third cover extends through the third hole; and a fourth hole formed in the fourth corner, wherein a portion of the fourth cover extends through the fourth hole. This embodiment may also include a first lip on the first cover repeatably deflectable at the portion of the first cover that extends through the first hole adapted to snugly engage a complementary cell phone first corner; a second lip on the second cover repeatably deflectable at the portion of the second cover that extends through the second hole adapted to snugly engage a complementary cell phone second corner; a third lip on the third cover repeatably deflectable at the portion of the third cover that extends through the third hole adapted to snugly engage a complementary cell phone third corner; and a fourth lip on the fourth cover repeatably deflectable at the portion of the fourth cover that extends through the fourth hole adapted to snugly engage a complementary cell phone fourth corner.

BRIEF DESCRIPTION OF THE DRAWINGS

A sample embodiment of the disclosure is set forth in the following description, is shown in the drawings and is particular and distinctly pointed out and set forth in the appended claims. The accompanying drawings, which are fully incorporated herein and constitute a part of the specification, illustrate various examples, methods, and other example embodiments of various aspects of the invention. It will be appreciated that the illustrated element boundaries (e.g., boxes, group of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE EMBODIMENT

The present disclosure relates to an apparatus for protecting a cellular phone. Unlike other conventional cellular phone cases, the current apparatus does not provide the entire surface protection, but provides a minimalistic and effective protection on a cellular phone so that a user can easily carry with him/her or put a cellular phone (with a case) in his/her pocket and appreciate the beauty of a cellular phone at the same time.

Figure 1:
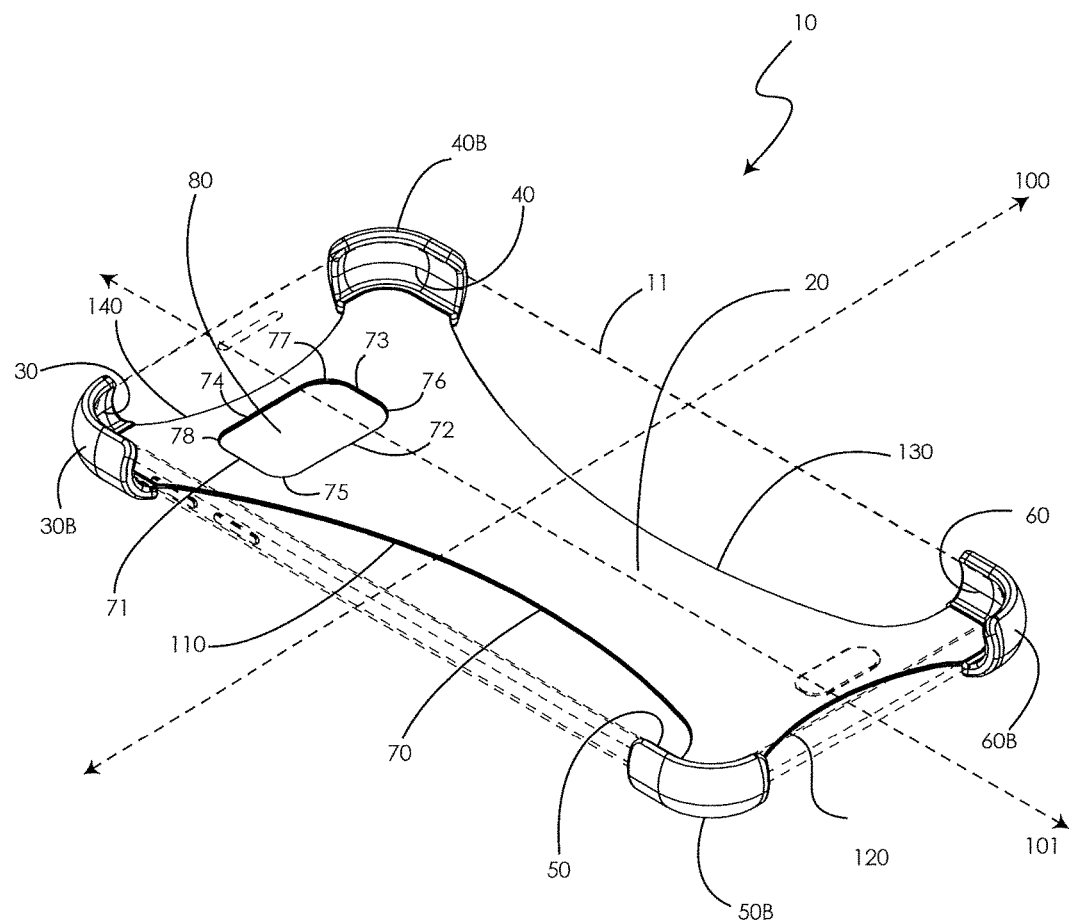
FIG. 1 is a top perspective view of a cell phone case in accordance with an embodiment with the present disclosure.
Figure 2:
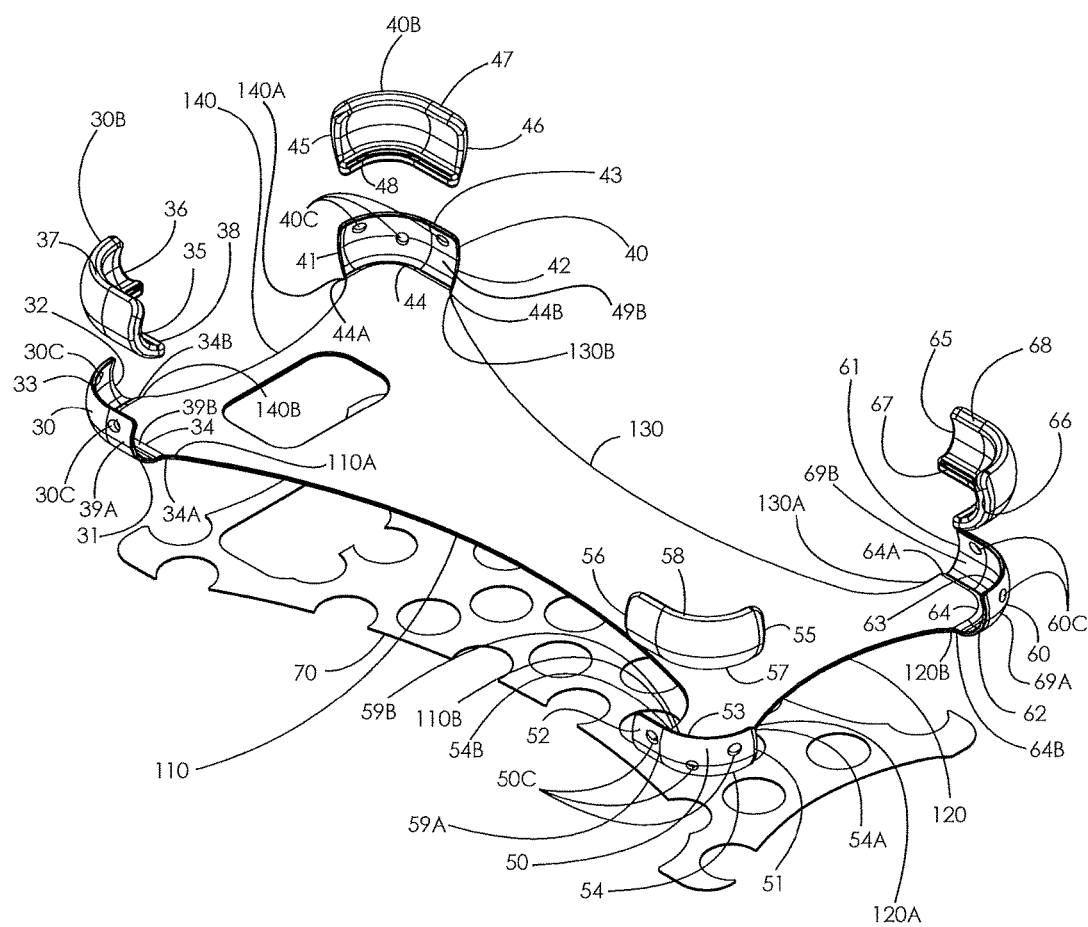
FIG. 2 is an exploded top perspective view of the cell phone case.

As depicted in FIG. 1, a cellular phone protection case 10 may comprise a main body 20, a first impact absorbing corner 30, a first impact absorbing cover 30B, a second impact absorbing corner 40, a second impact absorbing cover 40B, a third impact absorbing corner 50, a third impact absorbing cover 50B, a fourth impact absorbing corner 60, and a fourth impact absorbing cover 60B, and a decal 70 (FIG. 2).

The main body 20 of the cellular phone protection case 10 may form a first camera opening 80 which is defined by a first edge 71, a second edge 72, a third edge 73, a fourth edge 74 and a first rounded edge 75, a second rounded edge 76, a third rounded edge 77, and fourth rounded edge 78. The first edge 71 is connected with the first rounded edge 75 and fourth rounded edge 78. The second edge 72 is connected with the first rounded edge 75 and second rounded edge 76. The third edge 73 is connected with the second rounded edge 76 and the third rounded edge 77. The fourth edge 74 is connected with the third rounded edge 77 and fourth rounded edge 78. The first edge 71 and the third edge 73 are in parallel, and the second edge 72 and fourth edge 74 are in parallel as well. The first camera opening 80 has a rectangular shape with four rounded edges.

As depicted in FIG. 1, the main body 20 may further comprise a first arcuate edge 110, a second arcuate edge 120, a third arcuate edge 130, and a fourth arcuate edge 140. The first and third arcuate edges 110, 130 are apart from a Y-axis 101. The second and fourth arcuate edge 120, 140 are apart from an X-axis 100. The Y-axis 101 is associated with a central longitudinal axis of case 10 and the X-axis 100 is associated with a central transverse axis of case 10.

The four corners 30, 40, 50, 60 are upwardly protruded from a surface of the main body 20. The four corners 30, 40, 50, 60 are placed at the four corners of the main body 20 so that the four corners 30, 40, 50, 60 may hold four corners of a smart phone 11. More detailed descriptions on these four corners 30, 40, 50, 60 will be set out herein below.

As depicted in FIG. 2, the first impact absorbing corner 30 may define a plurality of holes 30C, a first vertically curved edge 31, a second vertically curved edge 32, a horizontally curved top edge 33, and a horizontally curved bottom edge 34. The first impact absorbing corner 30 may further comprise a first outer surface 39A and a first inner surface 39B facing opposite surface 39A. The plurality of holes 30C are through holes which are perforated from the first inner surface 39B of the first corner 30 to the first outer surface 39A of the first corner 30. The first impact absorbing cover 30B may comprise a first vertically curved edge 35, a second vertically curved edge 36, a horizontally curved top edge 37, a horizontally curved bottom edge 38.

The second impact absorbing corner 40 may define a plurality of holes 40C, a first vertically curved edge 41, a second vertically curved edge 42, a horizontally curved top edge 43, and a horizontally curved bottom edge 44. The second impact absorbing corner 40 may further comprise a second outer surface 49A and a second inner surface 49B facing opposite the surface 49A. The plurality of holes 40C are through holes which are perforated from the inner second surface 49B of the second corner 40 to the second outer surface 49A of the second corner 40. The second impact absorbing cover 40B may comprise a first vertically curved edge 45, a second vertically curved edge 46, a horizontally curved top edge 47, a horizontally curved bottom edge 48.

The third impact absorbing corner 50 may comprise a plurality of holes 50C, a first vertically curved edge 51, a second vertically curved edge 52, a horizontally curved top edge 53, and a horizontally curved bottom edge 54. The third impact absorbing corner 50 may further comprise an third outer surface 59A and an third inner surface 59B facing opposite the surface 59A. The plurality of holes 50C are through holes which are perforated from the third inner surface 59B of the third corner 50 to the third outer surface 59A of the third corner 50. The third impact absorbing cover 50B may comprise a first vertically curved edge 55, a second vertically curved edge 56, a horizontally curved top edge 57, a horizontally curved bottom edge 58.

The fourth impact absorbing corner 60 may comprise a plurality of holes 60C, a first vertically curved edge 61, a second vertically curved edge 62, a horizontally curved top edge 63, and a horizontally curved bottom edge 64. The fourth impact absorbing corner 60 may further comprise an fourth outer surface 69A and an fourth inner surface 69B facing opposite the surface 69A. The plurality of holes 60C are through holes which are perforated from the fourth inner surface 69B of the fourth corner 60 to the fourth outer surface 69A of the fourth corner 60. The fourth impact absorbing cover 60B may comprise a first vertically curved edge 65, a second vertically curved edge 66, a horizontally curved top edge 67, and a horizontally curved bottom edge 68.

With continued reference to FIG. 2, a first end 34A of the horizontally curved bottom edge 34 is connected with a first end 110A of the first arcuate edge 110. A second end 34B of the horizontally curved bottom edge 34 is connected with a second end 140B of the fourth arcuate edge 140. The first vertically curved edge 31 of the first impact absorbing corner 30 is fixedly connected with the first arcuate edge 110. The second vertically curved edge 32 of the first impact absorbing corner 30 is fixedly connected with the fourth arcuate edge 140.

A first end 44A of the horizontally curved bottom edge 44 is connected with a first end 140A of the fourth arcuate edge 140. A second end 44B of the horizontally curved bottom edge 44 is connected with a second end 130B of the third arcuate edge 130. The first vertically curved edge 41 of the fourth impact absorbing corner 60 is fixedly connected with the fourth arcuate edge 140. The second vertically curved edge 32 of the fourth impact absorbing corner 60 is fixedly connected with the third arcuate edge 130.

A first end 54A of the horizontally curved bottom edge 54 is connected with a first end 120A of the second arcuate edge 120. A second end 54B of the horizontally curved bottom edge 54 is connected with a second end 110B of the first arcuate edge 110. The first vertically curved edge 51 of the third impact absorbing corner 50 is fixedly connected with the second arcuate edge 140. The second vertically curved edge 52 of the third impact absorbing corner 50 is fixedly connected with the first arcuate edge 110.

A first end 64A of the horizontally curved bottom edge 64 is connected with a first end 130A of the third arcuate edge 130. A second end 64B of the horizontally curved bottom edge 64 is connected with a second end 120B of the second arcuate edge 120. The first vertically curved edge 61 of the fourth impact absorbing corner 60 is fixedly connected with the third arcuate edge 130. The second vertically curved edge 62 of the third impact absorbing corner 60 is fixedly connected with the second arcuate edge 120.

A transversely aligned first free space therebetween is defined between the first corner 30 which is spaced from the second corner 40. A transversely aligned second free space is defined between the third corner 50 which is spaced from the fourth corner 60. A longitudinally aligned third free space is defined between the first corner 30 and the third corner 50 and a longitudinally aligned fourth free space is defined between the second corner 40 and the third corner 60. The term free spaces is used herein to refer to the absence of any usual sidewall (orthogonal to the back wall) extending between the respective corners as is typical in a traditional cell phone case.

Figure 3:
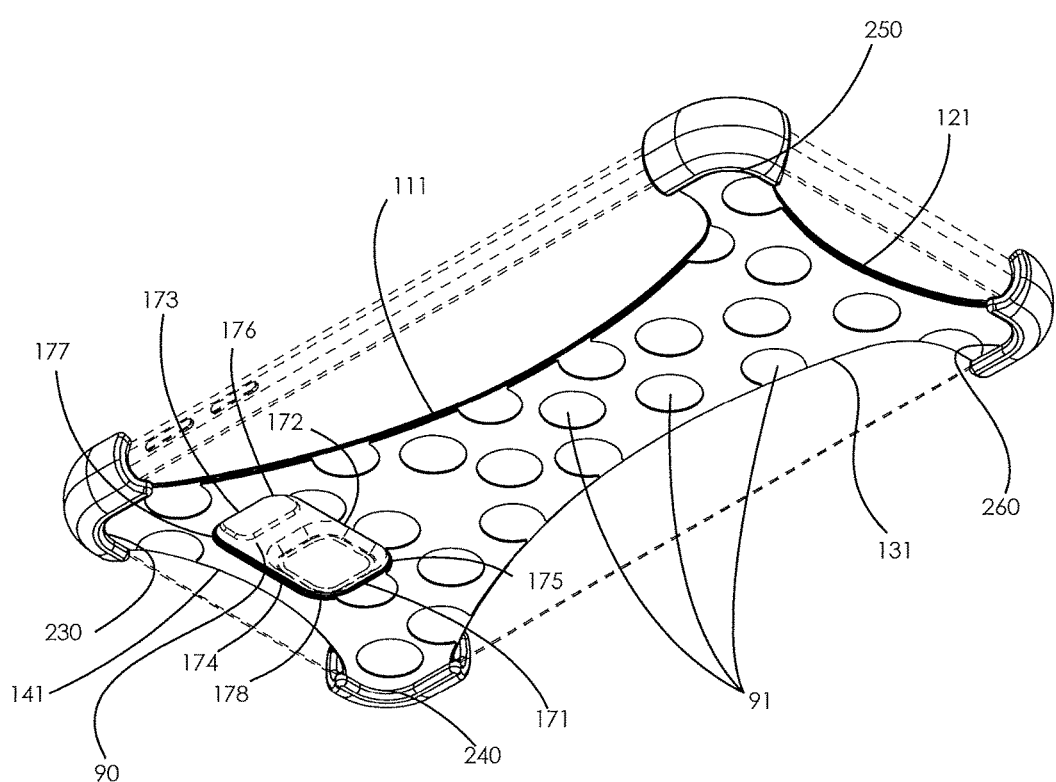
FIG. 3 is a bottom perspective view of the cell phone case.

As depicted FIG. 3, the decal 70 defines a second camera opening 90, and defines a plurality of perforated holes 91 simulating a polka-dot pattern, and includes a first rounded corner 230, a second rounded corner 240, a third rounded corner 250, a fourth rounded corner 260, a first arcuate edge 111, a second arcuate edge 121, a third arcuate edge 131, and a fourth arcuate edge 141. The second camera opening 90 which has a rectangular shape with four rounded corners is defined by a fifth edge 171, a sixth edge 172, a seventh edge 173, an eighth edge 174, a fifth rounded edge 175, a sixth rounded edge 176, a seventh rounded edge 177, and an eighth rounded edge 178. The fifth edge 171 is connected with the fifth rounded edge 175 and seventh rounded edge 178. The sixth edge 172 is connected with fifth rounded edge 175 and sixth rounded edge 176. The seventh edge 173 is connected with the sixth rounded edge 176 and seventh rounded edge 177. The eighth edge 174 is connected with the seventh rounded edge 177 and the eighth rounded edge 178. The fifth edge 171 and the seventh edge 173 are in parallel, and the sixth edge 172 and the eighth edge 174 are in parallel as well.

As depicted in FIG. 3, the decal 70 is fixedly attached to the main body 20 of the cellular phone protection case 10 and faces outwardly opposite the direction of an LCD on the phone 11. The plurality of perforated holes 91 may be randomly located in the decal or they may be purposefully patterned. Furthermore, the shapes, sizes, and numbers of holes 91 can also be arbitrarily chosen. The first camera opening 80 of the main body 20 is aligned directly with the second camera opening 90 of the decal 70. At the same token, the first arcuate edge 110, the second arcuate edge 120, the third arcuate edge 130, and the fourth arcuate edge 140 of the main body 20 are respectively aligned with the first arcuate edge 111, the second arcuate edge 121, the third arcuate edge 131, and the fourth arcuate edge 141 of the decal 70. Similarly, the first rounded corner 230, the second rounded corner 240, the third rounded corner 250, the fourth rounded corner 260 of the decal 70 are respectively aligned with the horizontally curved bottom edges 34, 44, 54, 64 of the main body 20.

Figure 4:
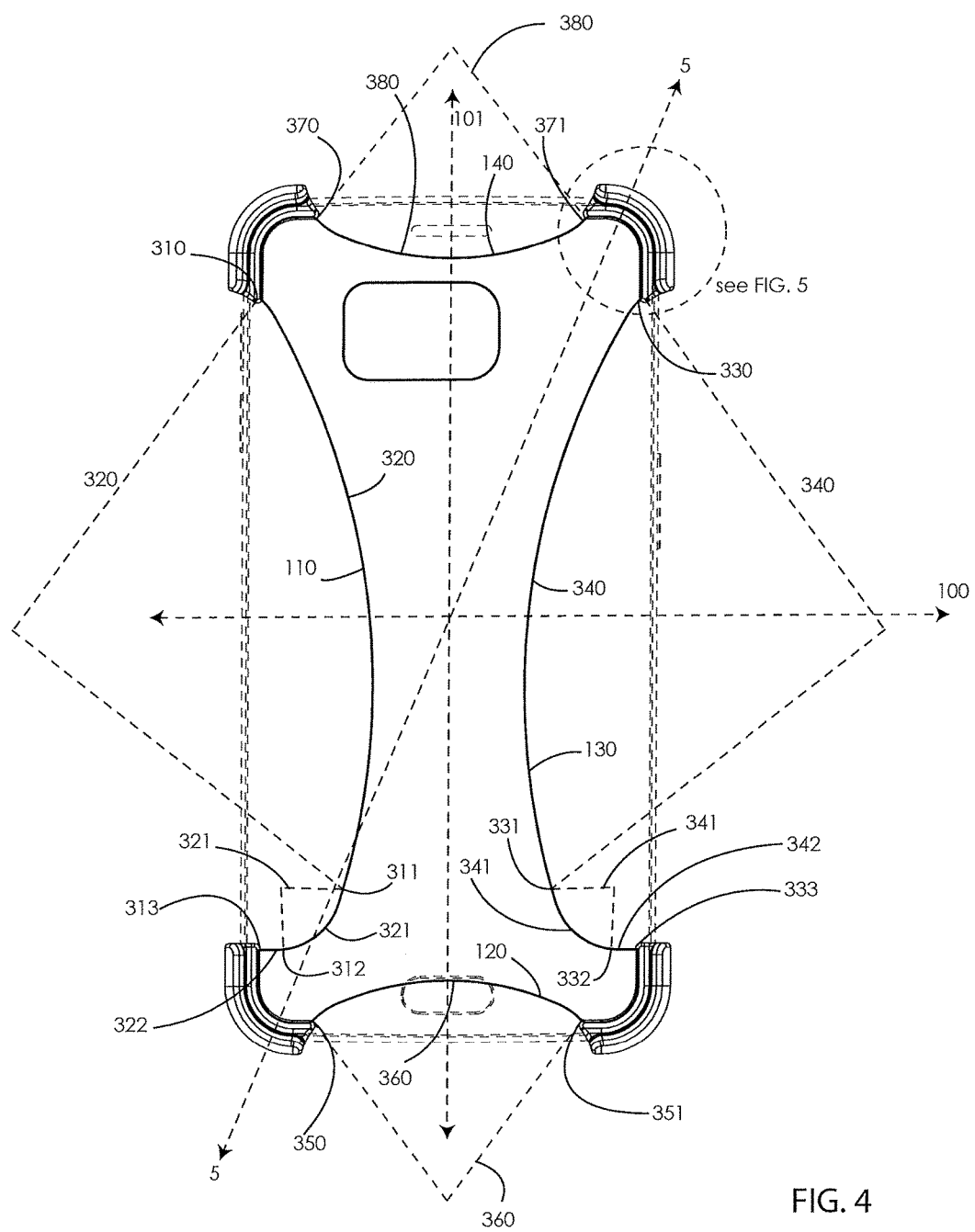
FIG. 4 is a top plan view of the cell phone case.

As depicted in FIG. 4, the first arcuate edge 110 and the third arcuate edge 130 are symmetrically located relative to the Y-axis 101. The second arcuate edge 120 and the fourth arcuate edge 140 are symmetrically located around the X-axis 100. The first arcuate edge 110 comprises a first point 310, a second point 311, a third point 312, and a fourth point 313. The first arcuate edge 110 comprises a first and a second radii of curvature 320 (R1), 321 (R2), and a first straight section 322. The first radius of curvature 320 (R1) extends from the first point 310 to the second point 311. The second radius of curvature (R2) 321 extends from the second point 311 to the third point 312. The first straight section 322 extends from the third point 312 to the fourth point 313.

The third arcuate edge 130 further comprises a fifth point 330, a sixth point 331, a seventh point 332, and an eighth point 333. The third arcuate edge 130 comprises a third and a fourth radii of curvature 340 (R3), 341 (R4) and a second straight section 342. The third radius of curvature (R3) 340 extends from the fifth point 330 to the sixth point 331. The fourth radius of curvature (R4) 341 extends from the sixth point 331 to the seventh point 332. The second straight section 342 extends from the seventh point 332 to the eighth point 333.

The second arcuate edge 120 comprises a fifth radius of curvature 360 (R5). The second arcuate edge 120 further comprises a ninth point 350 and a tenth point 351. The fifth radius of curvature (R5) 360 extends from the ninth point 350 to the tenth point 351.

The fourth arcuate edge 140 comprises a sixth radius of curvature 380. The fourth arcuate edge 140 further comprises a eleventh point 370 and a twelfth point 371. The sixth radius of curvature (R6) 380 extends from the eleventh point 370 to the twelfth point 371.

Figure 5:
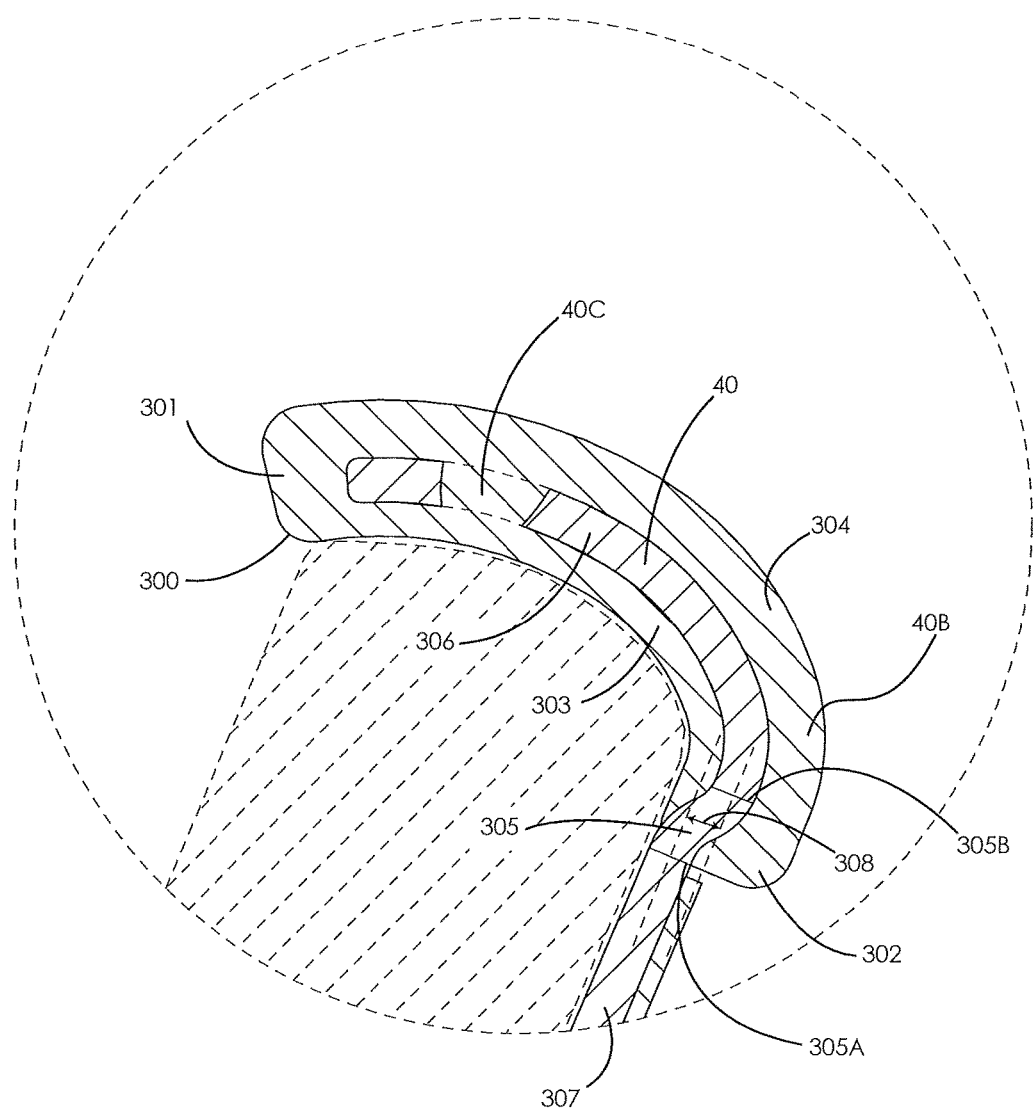
FIG. 5 is an enlarged cross section view of one corner of the cell phone case.

As depicted in FIG. 5, the first, second, third, and fourth impact absorbing covers 30B, 40B, 50B, and 60B comprises a forward facing front end 301, a rearwardly facing rear end 302, a first piece 303, and a second portion 304. The front end 301 comprises a front lip 300. The front lip 300 of the each cover 30B, 40B, 50B, 60B can be deflected so that the front lip 300 can snuggly engage a top surface of the smart phone 11.

The first portion 303 and the second portion 304 are connected and extend around the front end 301 and are connected through the plurality of holes 30C, 40C, 50C, 60C. In one embodiment, the first portion 303 and the second portion 304 may not be connected at the rear end 302. The first, second, third, and fourth impact absorbing covers 30B, 40B, 50B, and 60B are respectively over-molded around the first, second, third, and fourth impact absorbing corner 30, 40, 50, and 60 of the main body 20 which is generally made by a stamped steel shell of around 0.03 inch thickness. Particularly, the covers 30B, 40B, 50B, 60B are integrally foamed with the plurality of holes 30C, 40C, 50C, 60C of the corners 30, 40, 50, 60 respectively so that the covers 30B, 40B, 50B, 60B can be firmly molded and integrated with to the corners 30, 40, 50, 60 respectively. The corners 30, 40, 50, 60 are interposed between the first piece 303 and the second piece 304. The covers 30B, 40B, 50B, 60B may be formed from a rubber, a synthetic material, or any other material that may be over-molded to the corners 30, 40, 50, 60 in order to simultaneously grip the phone 11 and protect it against any impact.

As depicted in FIG. 5, the corners 30, 40, 50, 60, comprises an S-shaped portion 305, a rounded portion 306, and a flat portion 307. The S-shaped portion 305 comprises a first end 305A and a second end 305B. The first end 305A is connected with the flat portion 307 of the main body 20. The second end 305B is connected with the rounded surface of the main body 20. A center of the first end 305A and a center of the second end 305B are not aligned each other so that it creates an offset 308.

Figure 6:
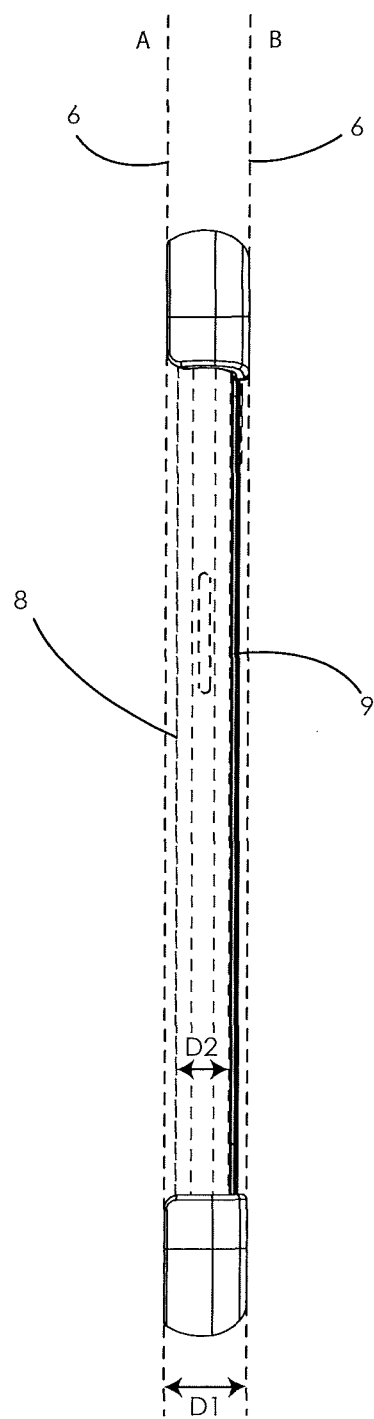
FIG. 6 is a side view of the cell phone case.

As depicted in FIG. 6, after over-molded, an overall thickness D1 of the case 10 with the covers 30B, 40B, 50B, 60B is larger than a thickness D2 of the main body 20 so that after the smart phone 11 is assembled with the case 10, an upper end 8 and a bottom end 9 of the main body 20 never touch the ground 6, regardless of how the case 10 carrying the phone 11 falls to the ground.

Figure 7:
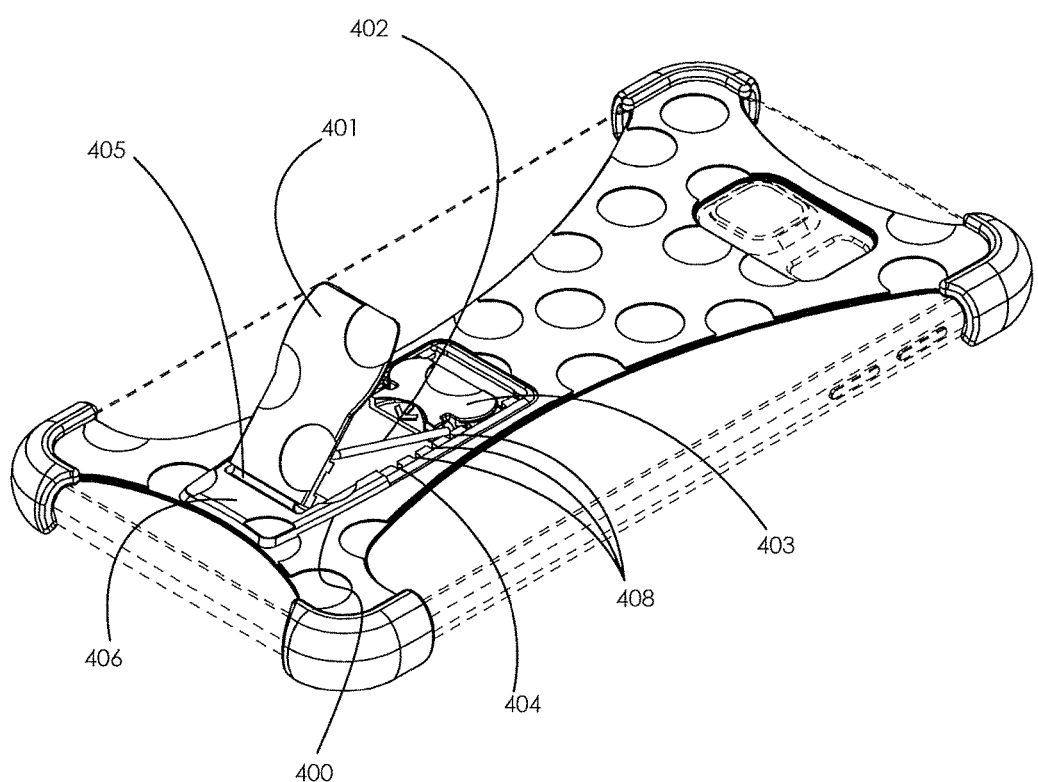
FIG. 7 is a bottom perspective view of the cell phone case with an optional stand assembly.

In another embodiment, as depicted in FIG. 7, a stand assembly 400 can be attached on a body of the case 10. The stand assembly 400 comprises a square plate 401, a height adjustable supporter 402, a slide plate 403, a step 404, a bendable connector 405, and an anchor 406. One end of the plate 401 is fixedly connected with the bendable connector 405. The bendable connector 405 is fixedly connected with the anchor 406. The slide plate 403 is slidably connected with the stand assembly 400 so that it longitudinally moves back and forth. One end of the supporter 402 is movably connected with the plate 401, and the other end of the supporter 402 is movably connected with the slide plate 403. The step 404 comprises a plurality of columns 408 so that the slide plate 403 can be anchored into one of the columns 408 of the step 404.

Figure 8:
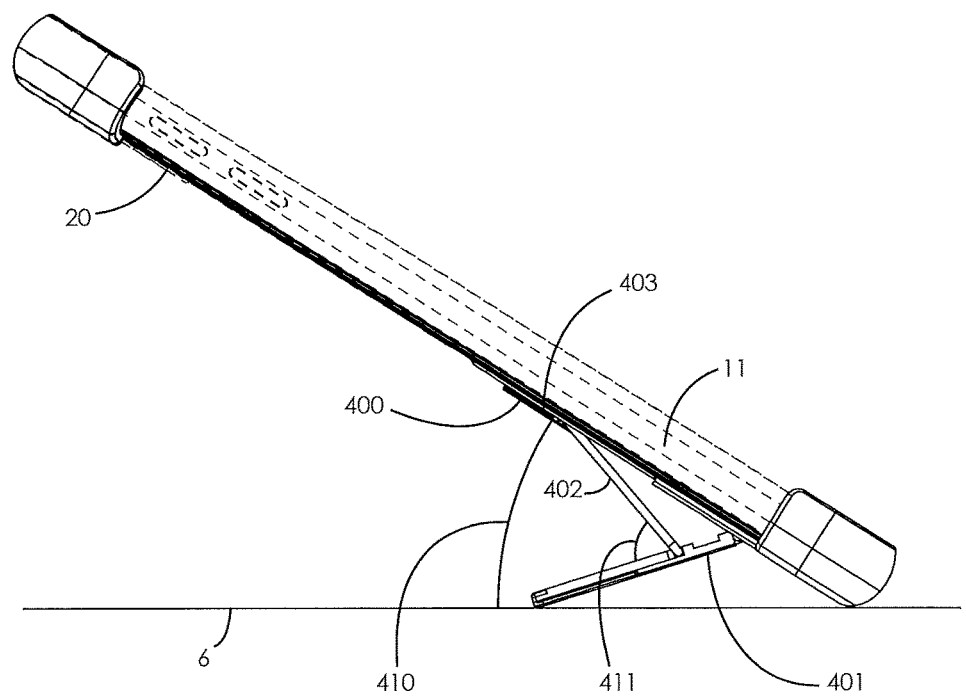
FIG. 8 is a side elevation view of the cell phone case as the stand assembly is expanded with a first angle.

FIG. 8 depicts the case 10 with the stand assembly 400 at a lower ground angle 410. The lower ground angle 410 is defined by an angle between the stand assembly 400 and the ground 6. A plate angle 411 is defined by the square plate 401 and the supporter 402. The plate angle 411 is changeable, and can be fixed by the supporter 402 at the lower ground angle 410 as the supporter 402 slidably moves along the assembly 400. At the desired lower ground angle 410, the slide plate 403 is engaged to lock the supporter 402 so that the supporter 402 is fixed at the lower ground angle 410. As the slide plate 403 is released from the lower ground angle 410, the supporter 402 is freely movable along the assembly 400.

Figure 9:
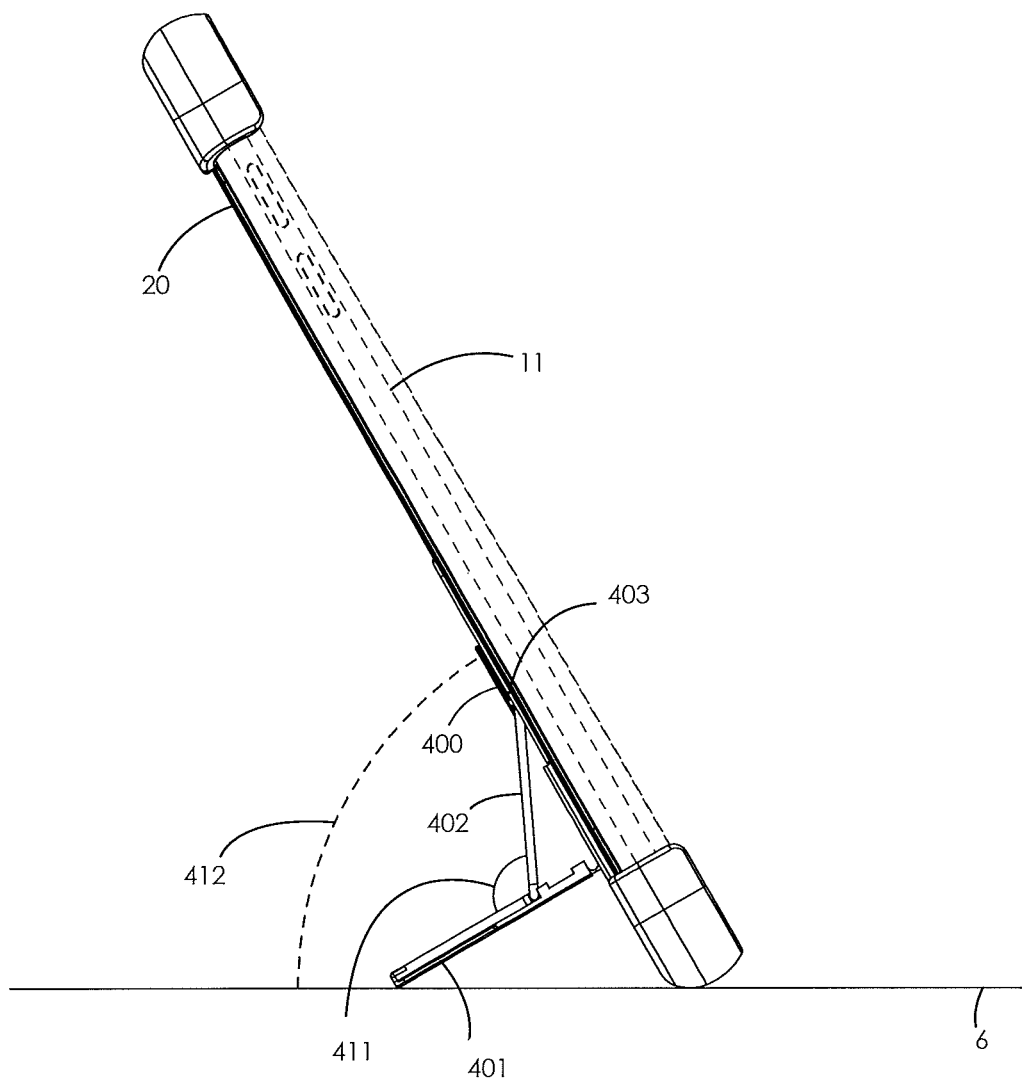
FIG. 9 is a side elevation view of the cell phone case as the stand assembly is expanded with a second angle.

FIG. 9 depicts the case 10 with the stand assembly 400 at a greater ground angle 412. The greater ground angle 412 is defined by an angle between the stand assembly 400 and the ground 6. A plate angle 411 is defined by the square plate 401 and the supporter 402. The plate angle 411 is changeable, and can be fixed by the supporter 402 at the greater ground angle 412 as the supporter 402 slidably moves along the assembly 400. At the desired greater ground angle 412, the slide plate 403 is engaged to lock the supporter 402 so that the supporter 402 is fixed at the greater ground angle 412. As the slide plate 403 is released from the greater ground angle 412, the supporter 402 is freely movable along the assembly 400.

Figure 10:
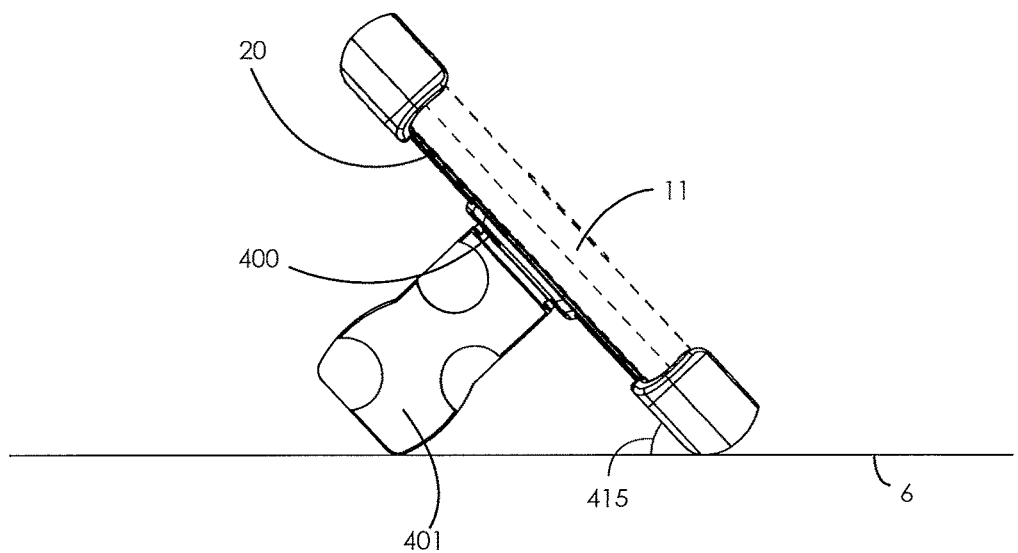
FIG. 10 is an end elevation view of the cell phone case with the stand assembly.

FIG. 10 depicts that the case 10 with the assembly 400 enables one of the corners of the square plate 401 to touch the ground 6. The stand assembly 400 supports the case 10 to lean against the ground 6. A landscape ground angle 415 can be changed as the plate angle 411 is adjusted by changing positions of the supporter 402 on the assembly 400.

In one embodiment, as depicted in FIGS. 8 and 9, the case 10 with the stand assembly 400 can be used in a portrait mode. In another embodiment, as depicted in FIG. 10, the case 10 with the stand assembly 400 can be used in a landscape mode.

As used herein, the term planar body refers to the portion of case 10 that is adapted to lie flat against the back of the cell phone. The planar body includes a transverse width greater than its thickness and forms a flat surface distinct from a conventional case utilizing wire-like, tube-like, or string-like connective members extending in an x-pattern between the four corners of the case.

While the present discourse has been described in connection with the preferred embodiments of the various figures, it is to be understood that other similar embodiments may be used or modifications or additions may be made to the described embodiment for performing the same function of the present discourse without deviating therefrom. Therefore, the present discourse should not be limited to any single embodiment, but rather construed in breadth and scope in accordance with the recitation of the appended claims.

What is claimed:

1. A cell phone case comprising:
a central longitudinal first axis and a central transverse second axis;
a first corner spaced from a second corner defining a transversely aligned first free space therebetween;
a third corner spaced from a fourth corner defining a transversely aligned second free space therebetween;
wherein a longitudinally aligned third free space is defined between the first corner and the third corner and a longitudinally aligned fourth free space is defined between the second corner and the third corner; and
a distinct first cover entirely surrounding a first side of the first corner adapted to engage a cell phone and at least partially surrounding an opposite second side of the first corner;
a distinct second cover entirely surrounding a first side of the second corner adapted to engage the cell phone and at least partially surrounding an opposite second side of the second corner;
a distinct third cover entirely surrounding a first side of the third corner adapted to engage the cell phone and at least partially surrounding an opposite second side of the third corner; and
a distinct fourth cover entirely surrounding a first side of the fourth corner adapted to engage the cell phone and at least partially surrounding an opposite second side of the fourth corner.

2. The cell phone of claim 1, further comprising:
a first hole formed in the first corner, wherein a portion of the first cover extends through the first hole;
a second hole formed in the second corner, wherein a portion of the second cover extends through the second hole;
a third hole formed in the third corner, wherein a portion of the third cover extends through the third hole; and
a fourth hole formed in the fourth corner, wherein a portion of the fourth cover extends through the fourth hole.

3. The cell phone of claim 2, further comprising:
a first lip on the first cover repeatably deflectable at the portion of the first cover that extends through the first hole adapted to snugly engage a complementary cell phone first corner;
a second lip on the second cover repeatably deflectable at the portion of the second cover that extends through the second hole adapted to snugly engage a complementary cell phone second corner;
a third lip on the third cover repeatably deflectable at the portion of the third cover that extends through the third hole adapted to snugly engage a complementary cell phone third corner; and
a fourth lip on the fourth cover repeatably deflectable at the portion of the fourth cover that extends through the fourth hole adapted to snugly engage a complementary cell phone fourth corner.

* * * * *